United States Patent
Ito et al.

(10) Patent No.: US 11,236,223 B2
(45) Date of Patent: Feb. 1, 2022

(54) RUBBER COMPOSITION FOR INNER LINER AND PNEUMATIC TIRE

(71) Applicant: SUMITOMO RUBBER INDUSTRIES, LTD., Kobe (JP)

(72) Inventors: Hiroshi Ito, Kobe (JP); Sakae Okubo, Kobe (JP); Kei Kohara, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 148 days.

(21) Appl. No.: 16/478,233

(22) PCT Filed: Feb. 2, 2018

(86) PCT No.: PCT/JP2018/003504
§ 371 (c)(1),
(2) Date: Jul. 16, 2019

(87) PCT Pub. No.: WO2018/143379
PCT Pub. Date: Aug. 9, 2018

(65) Prior Publication Data
US 2021/0130595 A1 May 6, 2021

(30) Foreign Application Priority Data
Feb. 3, 2017 (JP) .............................. JP2017-018523

(51) Int. Cl.
*C08L 23/22* (2006.01)
*B60C 1/00* (2006.01)

(52) U.S. Cl.
CPC ............ *C08L 23/22* (2013.01); *B60C 1/0008* (2013.01); *C08L 2207/24* (2013.01)

(58) Field of Classification Search
CPC ..... C08L 23/22; C08L 2207/24; B60C 1/0008
See application file for complete search history.

(56) References Cited

U.S. PATENT DOCUMENTS

| | | | |
|---|---|---|---|
| 2004/0092648 A1 | 5/2004 | Jones et al. | |
| 2014/0116594 A1 | 5/2014 | Miyazaki | |
| 2016/0263942 A1* | 9/2016 | Tsuchida | ............. B60C 11/0008 |

FOREIGN PATENT DOCUMENTS

| | | | | |
|---|---|---|---|---|
| CN | 105143335 A | 12/2015 | | |
| EP | 2 957 592 A1 | 12/2015 | | |
| JP | 2005-113027 A | 4/2005 | | |
| JP | 2007-112847 A | 5/2007 | | |
| JP | 2007-320992 A | 12/2007 | | |
| JP | 2008-126634 A | 6/2008 | | |
| JP | 2013-14667 A | 1/2013 | | |
| JP | 2014-31404 A | 2/2014 | | |
| JP | 2014-84430 A | 5/2014 | | |
| JP | 2015-93928 A | 5/2015 | | |
| WO | WO-2015076049 A1 * | 5/2015 | ............... C08K 5/09 | |

OTHER PUBLICATIONS

International Search Report dated Mar. 20, 2018 in PCT/JP2018/003504 filed Feb. 2, 2018.
Technical Data, Struktol WB16, Struktol Company of America, http://www.struktol.com/pdfs/WB16.pdf, Jan. 27, 2012, 1 page.
"News Release: Yokohama Develops New Inner Liner Technology for Commercial Vehicle Tires *Substantially Reduces Natural Air Leakage*," The Yokohama Rubber Co., Ltd., http://www.y-yokohama.com/release/pdf/201341615tr001.pdf, Apr. 16, 2013, 2 pages (with English translation).

\* cited by examiner

*Primary Examiner* — Angela C Scott
(74) *Attorney, Agent, or Firm* — Oblon, McClelland, Maier & Neustadt, L.L.P.

(57) ABSTRACT

The present invention provides an innerliner rubber composition having an excellent balance of sheet processability and air retention properties, and a pneumatic tire including the rubber composition. The present invention relates to an innerliner rubber composition, containing a rubber component; a mixture of a fatty acid metal salt and a fatty acid amide; an oil; and a C5 petroleum resin, the rubber component including, based on 100% by mass thereof, at least 70% by mass of a butyl-based rubber, the mixture being present in an amount of 0.8 to 3.2 parts by mass per 100 parts by mass of the rubber component, the mixture, the oil, and the C5 petroleum resin being present in a combined amount of 6.0 to 16.0 parts by mass per 100 parts by mass of the rubber component.

20 Claims, No Drawings

RUBBER COMPOSITION FOR INNER LINER AND PNEUMATIC TIRE

TECHNICAL FIELD

The present invention relates to an innerliner rubber composition and a pneumatic tire including the rubber composition.

BACKGROUND ART

Conventional rubber compositions for tire innerliners generally contain butyl-based rubbers to enhance the air retention properties of innerliners (Patent Literature 1).

Moreover, the innerliner rubber compositions contain a relatively large amount of process oil to enhance properties such as processability during tire building. However, such rubber compositions also have disadvantages such as insufficient air retention properties. Thus, there is a need for innerliners which are excellent in the balance of properties including processability during tire building, and air retention properties of the vulcanized rubber.

CITATION LIST

Patent Literature

Patent Literature 1: JP 2005-113027 A

SUMMARY OF INVENTION

Technical Problem

The present invention aims to solve the problems and provide an innerliner rubber composition having an excellent balance of sheet processability and air retention properties, and a pneumatic tire including the rubber composition.

Solution to Problem

The present invention relates to an innerliner rubber composition, containing: a rubber component; a mixture of a fatty acid metal salt and a fatty acid amide; an oil; and a C5 petroleum resin, the rubber component including, based on 100% by mass thereof, at least 70% by mass of a butyl-based rubber, the mixture being present in an amount of 0.8 to 3.2 parts by mass per 100 parts by mass of the rubber component, the mixture, the oil, and the C5 petroleum resin being present in a combined amount of 6.0 to 16.0 parts by mass per 100 parts by mass of the rubber component.

The butyl-based rubber preferably includes a reclaimed butyl-based rubber.

The rubber composition preferably contains a quinoline antioxidant.

The present invention also relates to a pneumatic tire, including an innerliner containing the rubber composition.

Advantageous Effects of Invention

The innerliner rubber composition of the present invention contains a rubber component; a mixture of a fatty acid metal salt and a fatty acid amide; an oil; and a C5 petroleum resin, wherein the rubber component includes, based on 100% by mass thereof, at least 70% by mass of a butyl-based rubber; the mixture is present in an amount of 0.8 to 3.2 parts by mass per 100 parts by mass of the rubber component; and the mixture, the oil, and the C5 petroleum resin are present in a combined amount of 6.0 to 16.0 parts by mass per 100 parts by mass of the rubber component. Such an innerliner rubber composition provides an improved balance of sheet processability and air retention properties.

DESCRIPTION OF EMBODIMENTS

The innerliner rubber composition of the present invention contains predetermined amounts of a rubber component including a butyl-based rubber, a mixture of a fatty acid metal salt and a fatty acid amide, an oil, and a C5 petroleum resin.

A composition incorporating predetermined amounts of a mixture of a fatty acid metal salt and a fatty acid amide, an oil, and a C5 petroleum resin with a rubber component including a large amount of a butyl-based rubber has an improved balance of sheet processability and air retention properties. Particularly when the mixture is added to a composition containing a reclaimed butyl-based rubber, the balance of the properties is significantly (synergistically) improved, for example, as compared to when it is added to a composition including only a usual butyl-based rubber as a butyl-based rubber.

Similarly, when the mixture is added to a composition containing a quinoline antioxidant or a composition containing predetermined amounts of an oil and a C5 petroleum resin, the balance of the properties is also significantly (synergistically) improved, for example, as compared to when it is added to a composition including an amine antioxidant as an antioxidant or a composition including only an oil as a softener.

The rubber component includes a butyl-based rubber. Examples of the butyl-based rubber include butyl rubber (IIR); and halogenated butyl rubbers such as brominated butyl rubber (Br-IIR), chlorinated butyl rubber (Cl-IIR), and fluorinated butyl rubber (F-IIR). To achieve a balanced improvement of sheet processability and air retention properties, halogenated butyl rubbers are preferred among these, with brominated butyl rubber or chlorinated butyl rubber being more preferred.

The butyl-based rubber in the present invention preferably includes a combination of a usual butyl-based rubber (a butyl-based rubber other than reclaimed butyl-based rubbers) and a reclaimed butyl-based rubber. Since reclaimed butyl-based rubbers typically contain a large amount of non-halogenated butyl rubber (regular butyl rubber), their combined use with halogenated butyl rubbers ensures good air retention properties and cure rate. Particularly when a mixture of a fatty acid metal salt and a fatty acid amide is added to a composition containing a reclaimed butyl-based rubber, the balance of sheet processability and air retention properties is significantly (synergistically) improved.

The term "reclaimed butyl-based rubber" refers to the butyl-based rubber fraction contained in ground particles of a rubber product containing a large amount of butyl-based rubber such as a tire tube or a bladder for use in tire production, or the butyl-based rubber fraction contained in a product obtained by heating/pressuring the ground particles. This term encompasses revulcanizable rubbers prepared by scission of crosslinking bonds (devulcanization) of a rubber component. Usually, about 50% by mass of the ground particles corresponds to a reclaimed butyl-based rubber. The reclaimed butyl-based rubber also contains sulfur, but the sulfur has been deactivated so as not to be involved in crosslinking.

Examples of commercial products of the reclaimed butyl-based rubber include reclaimed rubber from tubes produced by Muraoka Rubber Reclaiming Co., Ltd. and reclaimed rubber from bladders produced by Car Quest Co., Ltd. The reclaimed rubber from tubes of Muraoka Rubber Reclaiming Co., Ltd. is prepared by heat treating butyl tubes under pressure. The reclaimed rubber from bladders of Car Quest Co., Ltd. is prepared by grinding bladders in an extruder. These reclaimed butyl-based rubbers may be used alone, or two or more of them may be used in combination.

The total amount of the butyl-based rubber based on 100% by mass of the rubber component is 70% by mass or more, preferably 75% by mass or more, more preferably 80% by mass or more. When the total amount is less than 70% by mass, air retention properties may be insufficient. The total amount may be 100% by mass, but in view of sheet processability and air retention properties, the total amount is preferably 95% by mass or less, more preferably 90% by mass or less.

The amount of the reclaimed butyl-based rubber based on 100% by mass of the rubber component is preferably 5% by mass or more, more preferably 8% by mass or more. When the amount is less than 5% by mass, the advantages from using the reclaimed butyl-based rubber may be insufficient. The amount is preferably 30% by mass or less, more preferably 25% by mass or less. When the amount is more than 30% by mass, sufficient air retention properties or cure rate may not be ensured.

The amount of the reclaimed butyl-based rubber based on 100% by mass of total butyl-based rubber (the combined amount of the usual butyl-based rubber and reclaimed butyl-based rubber) in the rubber composition is preferably 7% by mass or more, more preferably 10% by mass or more. When the amount is less than 7% by mass, the advantages from using the reclaimed butyl-based rubber may be insufficient. The amount is preferably 35% by mass or less, more preferably 30% by mass or less. When the amount is more than 35% by mass, sufficient air retention properties or cure rate may not be ensured.

The rubber composition of the present invention preferably contains an isoprene-based rubber to achieve a balanced improvement of sheet processability and air retention properties.

Examples of the isoprene-based rubber include natural rubber (NR), epoxidized natural rubber (ENR), and polyisoprene rubber (IR). NR or IR is preferred among these because they allow for a balanced improvement of sheet processability and air retention properties.

The NR is not particularly limited and may be one commonly used in the tire industry, such as SIR20, RSS π3, or TSR20. The IR is not particularly limited and may be one commonly used in the tire industry.

The amount of the isoprene-based rubber based on 100% by mass of the rubber component is preferably 5% by mass or more, more preferably 10% by mass or more. When the amount is less than 5% by mass, sheet processability and air retention properties may not be balanced. The amount is preferably 30% by mass or less, more preferably 25% by mass or less. When the amount is more than 30% by mass, the vulcanized rubber may have insufficient air retention properties.

The rubber component in the present invention may include additional rubbers other than the butyl-based rubber and isoprene-based rubber. Examples include diene rubbers such as polybutadiene rubber (BR), styrene-butadiene rubber (SBR), ethylene-propylene-diene rubber (EPDM), styrene-isoprene-butadiene rubber (SIBR), chloroprene rubber (CR), and acrylonitrile butadiene rubber (NBR). These rubbers may be used alone, or two or more of these may be used in combination.

A mixture of a fatty acid metal salt and a fatty acid amide is used in the present invention. The addition of the mixture to the butyl-based rubber such as a reclaimed butyl-based rubber improves the balance of sheet processability and air retention properties.

Examples of the fatty acid of the fatty acid metal salt include, but are not limited to, saturated or unsaturated fatty acids, preferably C6-C28, more preferably C10-C25, still more preferably C14-C20 saturated or unsaturated fatty acids, such as lauric acid, myristic acid, palmitic acid, stearic acid, oleic acid, linoleic acid, linolenic acid, arachidic acid, behenic acid, and nervonic acid. These fatty acids may be used alone, or two or more of these may be used in admixture. Among these, saturated fatty acids are preferred, with C14-C20 saturated fatty acids being more preferred.

Examples of the metal of the fatty acid metal salt include alkali metals such as potassium and sodium, and alkaline earth metals such as magnesium, calcium, and barium, as well as zinc, nickel, and molybdenum. Among these, zinc or calcium is preferred.

The fatty acid amide may be a saturated fatty acid amide or an unsaturated fatty acid amide. Examples of the saturated fatty acid amide include N-(1-oxooctadecyl) sarcosine, stearamide, and behenamide. Examples of the unsaturated fatty acid amide include oleamide and erucamide.

The amount of the mixture per 100 parts by mass of the rubber component is 0.8 parts by mass or more, preferably 1.0 part by mass or more, more preferably 1.2 parts by mass or more. When the amount is less than 0.8 parts by mass, a sheet processability-improving effect may not be obtained. Moreover, the amount is 3.2 parts by mass or less, preferably 3.0 parts by mass or less, more preferably 2.8 parts by mass or less. When the amount is more than 3.2 parts by mass, fuel economy may be deteriorated.

The rubber composition of the present invention preferably contains carbon black. This provides good properties such as sheet processability and air retention properties. Examples of the carbon black include GPF, HAF, ISAF, and SAF.

The carbon black preferably has a nitrogen adsorption specific surface area ($N_2SA$) of 10 $m^2/g$ or more, more preferably 20 $m^2/g$ or more. When the $N_2SA$ is less than 10 $m^2/g$, properties such as reinforcing properties may be reduced. The $N_2SA$ is preferably 70 $m^2/g$ or less, more preferably 40 $m^2/g$ or less. When the $N_2SA$ is more than 70 $m^2/g$, sheet processability may be deteriorated.

The nitrogen adsorption specific surface area of the carbon black is measured in accordance with JIS K 6217-2: 2001.

The amount of the carbon black per 100 parts by mass of the rubber component is preferably 20 parts by mass or more, more preferably 40 parts by mass or more. When the amount is less than 20 parts by mass, reinforcing properties may be reduced. The amount is also preferably 100 parts by mass or less, more preferably 80 parts by mass or less. When the amount is more than 100 parts by mass, sheet processability may be deteriorated.

The rubber composition of the present invention includes an oil and a C5 petroleum resin in addition to the butyl-based rubber and the mixture. This provides good sheet processability and improves the balance of the properties.

Examples of the oil include process oils such as paraffinic process oils, aromatic process oils, and naphthenic process oils. The amount of the oil per 100 parts by mass of the rubber component is preferably 3.0 to 9.0 parts by mass or less, more preferably 4.0 to 7.0 parts by mass.

C5 petroleum resins are produced by polymerizing C5 (carbon number: 5) petroleum hydrocarbons. The term "C5 petroleum hydrocarbons" refers to a C5 fraction (a fraction with a carbon number of 5) obtained by thermal cracking of naphtha. Specific examples include diolefins such as isoprene, 1,3-pentadiene, dicyclopentadiene, and piperylene; and monoolefins such as 2-methyl-1-butene, 2-methyl-2-butene, and cyclopentene. The amount of the C5 petroleum resin per 100 parts by mass of the rubber component is preferably 2.0 to 9.0 parts by mass, more preferably 3.0 to 7.0 parts by mass.

The C5 petroleum resin preferably has a softening point of 50° C. or higher, more preferably 80° C. or higher. The softening point is also preferably 150° C. or lower, more preferably 120° C. or lower. When the softening point is within the range indicated above, the properties can be well achieved. The softening point is determined in accordance with JIS K 6220-1:2001 using a ring and ball softening point measuring apparatus and defined as the temperature at which the ball drops down.

The combined amount of the mixture, the oil, and the C5 petroleum resin per 100 parts by mass of the rubber component is 6.0 parts by mass or more, preferably 8.0 parts by mass or more. When the combined amount is less than 6.0 parts by mass, sheet processability or air retention properties tend to decrease. Moreover, the combined amount is 16.0 parts by mass or less, preferably 13.0 parts by mass or less. When the combined amount is more than 16.0 parts by mass, air retention properties may be deteriorated.

A quinoline antioxidant is preferably incorporated in the present invention. Examples of the quinoline antioxidant include 2,2,4-trimethyl-1,2-dihydroquinoline polymer, 6-ethoxy-2,2,4-trimethyl-1,2-dihydroquinoline, 6-anilino-2,2,4-trimethyl-1,2-dihydroquinoline, and poly(2,2,4-trimethyl-1,2-dihydroquinoline).

The amount of the quinoline antioxidant per 100 parts by mass of the rubber component is preferably 0.2 parts by mass or more, more preferably 0.7 parts by mass or more. When the amount is less than 0.2 parts by mass, its addition may produce no effect. The amount is also preferably 5.0 parts by mass or less, more preferably 3.0 parts by mass or less, still more preferably 2.0 parts by mass or less. When the amount is more than 5.0 parts by mass, discoloration (brown discoloration) or tan δ deterioration tends to occur.

In addition to the above-mentioned components, the rubber composition of the present invention may appropriately contain compounding agents commonly used in rubber composition production, including, for example: fillers such as silica, zinc oxide, stearic acid, waxes, vulcanizing agents such as sulfur, and vulcanization accelerators.

The rubber composition of the present invention can be prepared by known methods. For example, the rubber composition may be prepared by kneading the components in a rubber kneading machine such as an open roll mill, a Banbury mixer, or an internal mixer, and vulcanizing the kneaded mixture.

The pneumatic tire of the present invention can be produced using the rubber composition by usual methods. Specifically, the unvulcanized rubber composition incorporating additives as needed may be extruded into the shape of an innerliner and then assembled with other tire components in a usual manner on a tire building machine to form an unvulcanized tire, which may then be heated and pressurized in a vulcanizer to produce a tire.

EXAMPLES

The present invention is specifically described with reference to examples, but the present invention is not limited to the examples.

The chemicals used in the examples and comparative examples are listed below.

NR: RSS #3

Halogenated butyl-based rubber: Chlorobutyl HT1066 (chlorinated butyl rubber) available from Exxon Chemical Reclaimed butyl-based rubber: reclaimed butyl-based rubber available from Car Quest (butyl rubber: 50% by mass, carbon black N660: 33% by mass, others: 17% by mass)

Carbon black N660: SHOBLACK N660 available from Cabot Japan K.K. ($N_2SA$: 35 $m^2/g$)

Oil 1 (paraffinic process oil): Diana Process PA32 available from Idemitsu Kosan Co., Ltd. (paraffinic component: 67% by mass, naphthenic component: 28% by mass, aromatic component: 5% by mass)

Oil 2: paraffinic process oil (paraffinic component: 68% by mass, naphthenic component: 28% by mass, aromatic component: 4% by mass)

C5 petroleum resin 1: Marukarez T-100AS available from Maruzen Petrochemical Co., Ltd. (C5 petroleum resin: aliphatic petroleum resin formed mainly from olefins and diolefins in C5 fraction obtained by naphtha cracking, softening point: 100° C.)

C5 petroleum resin 2: Petrotack 100V available from Tosoh Corporation (C5 petroleum resin: aliphatic petroleum resin formed mainly from olefins and diolefins in C5 fraction obtained by naphtha cracking, softening point: 98° C.)

Processing aid 1: WB16 available from STRUKTOL (a mixture of a fatty acid metal salt (fatty acid calcium salt, constituent fatty acids: C14-C20 saturated fatty acids) and a fatty acid amide)

Antioxidant RD: NOCRAC 224 (2,2,4-trimethyl-1,2-dihydroquinoline polymer) available from Ouchi Shinko Chemical Industrial Co., Ltd.

Antioxidant 6C: NOCRAC 6C (N-phenyl-N'-(1,3-dimethylbutyl)-p-phenylenediamine) available from Ouchi Shinko Chemical Industrial Co., Ltd.

Stearic acid: TSUBAKI available from NOF Corporation

Zinc oxide: zinc oxide #2 available from Mitsui Mining & Smelting Co., Ltd.

Sulfur (containing 5% by mass of oil): HK-200-5 available from Hosoi Chemical Industry Co., Ltd. (oil content: 5% by mass)

Vulcanization accelerator DM: NOCCELER DM (di-2-benzothiazolyl disulfide) available from Ouchi Shinko Chemical Industrial Co., Ltd.

Examples and Comparative Examples

According to each formulation shown in the tables, the chemicals other than the zinc oxide, sulfur, and vulcanization accelerator were kneaded using a 1.7 L Banbury mixer for five minutes until the discharge temperature reached 160° C. to obtain a kneaded mixture. Then, the zinc oxide, sulfur, and vulcanization accelerator were added to the kneaded mixture, followed by kneading for four minutes using an open two-roll mill until the temperature reached 105° C. to obtain an unvulcanized rubber composition.

The unvulcanized rubber composition was extruded into a predetermined shape and press-vulcanized at 170° C. for 12 minutes.

Since innerliners themselves in thin film form are difficult to sample, rubber specimens appropriate for the purposes of the below-mentioned tests were prepared and evaluated. Comparative Examples 1-1, 5-1, 6-1, and 7-1 are used as standards of comparison in Tables 1 to 4, Table 5, Table 6, and Table 7, respectively.

(Sheet Processability)

The unvulcanized rubber compositions were extruded and evaluated in terms of the following four properties: scorching of the extrudate, flatness of the sheet, retention of extrudate dimensions (no uneven shrinkage of the sheet), and straightness (no edge irregularities) to determine the sheet processability of each formulation example, which is expressed as an index, with the standard comparative example set equal to 100. A higher sheet processability index indicates better sheet processability.

(Air Retention Properties (Resistance to Air Permeation))

The vulcanized rubber compositions were measured for air permeation rate in accordance with ASTM D-1434-75M. The air permeation rate of each formulation example is expressed as an index using the equation below, with Comparative Example 1-1 set equal to 100. A higher air retention properties index indicates that the vulcanized rubber composition has a lower air permeation rate and better air retention properties. (Air retention properties index)=(air permeation rate of standard comparative example)/(air permeation rate of each formulation example)×100

TABLE 1

|  |  | Example | | | | Comparative Example | | | | | |
| --- | --- | --- | --- | --- | --- | --- | --- | --- | --- | --- | --- |
|  |  | 1-1 | 1-2 | 1-3 | 1-4 | 1-1 | 1-2 | 1-3 | 1-4 | 1-5 | 1-6 |
| Formulation (parts by mass) | NR | 20 | 20 | 20 | 20 | 20 | 20 | 20 | 20 | 20 | 20 |
|  | Halogenated butyl rubber | 70 | 70 | 70 | 70 | 70 | 70 | 70 | 70 | 70 | 70 |
|  | Reclaimed butyl-based rubber(Butyl-based rubber content) | 20 (10) | 20 (10) | 20 (10) | 20 (10) | 20 (10) | 20 (10) | 20 (10) | 20 (10) | 20 (10) | 20 (10) |
|  | Carbon black N660 | 60 | 60 | 60 | 60 | 60 | 60 | 60 | 60 | 60 | 60 |
|  | Oil 1 | 6.0 | 5.0 | 4.0 | 4.0 | 7.0 | 6.5 | 3.5 | 9.0 | — | 10.0 |
|  | C5 petroleum resin 1 | 5.0 | 5.0 | 5.0 | 5.0 | 5.0 | 5.0 | 5.0 | 5.0 | — | 10.0 |
|  | Processing aid 1 | 1.0 | 2.0 | 3.0 | 1.0 | — | 0.5 | 3.5 | — | 2.0 | 5.0 |
|  | Antioxidant RD | 1.0 | 1.0 | 1.0 | 1.0 | 1.0 | 1.0 | 1.0 | 1.0 | 1.0 | 1.0 |
|  | Stearic acid | 1.5 | 1.5 | 1.5 | 1.5 | 1.5 | 1.5 | 1.5 | 1.5 | 1.5 | 1.5 |
|  | Zinc oxide | 1.5 | 1.5 | 1.5 | 1.5 | 1.5 | 1.5 | 1.5 | 1.5 | 1.5 | 1.5 |
|  | Sulfur (containing 5% by mass of oil) | 0.4 | 0.4 | 0.4 | 0.4 | 0.4 | 0.4 | 0.4 | 0.4 | 0.4 | 0.4 |
|  | Vulcanization accelerator DM | 1.2 | 1.2 | 1.2 | 1.2 | 1.2 | 1.2 | 1.2 | 1.2 | 1.2 | 1.2 |
| Evaluation | Sheet processability index | 110 | 115 | 110 | 109 | 100 | 100 | 95 | 110 | 95 | 95 |
|  | Air retention properties index | 110 | 110 | 110 | 109 | 100 | 100 | 110 | 95 | 95 | 95 |

TABLE 2

|  |  | Example 1-2 | Comparative Example 1-1 | Example 2-1 | Comparative Example 2-1 |
| --- | --- | --- | --- | --- | --- |
| Formulation (parts by mass) | NR | 20 | 20 | 20 | 20 |
|  | Halogenated butyl rubber | 70 | 70 | 80 | 80 |
|  | Reclaimed butyl-based rubber (Butyl-based rubber content) | 20 (10) | 20 (10) | — | — |
|  | Carbon black N660 | 60 | 60 | 60 | 60 |
|  | Oil 1 | 5.0 | 7.0 | 5.0 | 7.0 |
|  | C5 petroleum resin 1 | 5.0 | 5.0 | 5.0 | 5.0 |
|  | Processing aid 1 | 2.0 | — | 2.0 | — |
|  | Antioxidant RD | 1.0 | 1.0 | 1.0 | 1.0 |
|  | Stearic acid | 1.5 | 1.5 | 1.5 | 1.5 |
|  | Zinc oxide | 1.5 | 1.5 | 1.5 | 1.5 |
|  | Sulfur (containing 5% by mass of oil) | 0.4 | 0.4 | 0.4 | 0.4 |
|  | Vulcanization accelerator DM | 1.2 | 1.2 | 1.2 | 1.2 |
| Evaluation | Sheet processability index | 115 | 100 | 100 | 95 |
|  | Air retention properties index | 110 | 100 | 105 | 100 |

TABLE 3

|  |  | Example 1-2 | Comparative Example 1-1 | Example 3-1 | Comparative Example 3-1 |
|---|---|---|---|---|---|
| Formulation (parts by mass) | NR | 20 | 20 | 20 | 20 |
|  | Halogenated butyl rubber | 70 | 70 | 70 | 70 |
|  | Reclaimed butyl-based rubber (Butyl-based rubber content) | 20 (10) | 20 (10) | 20 (10) | 20 (10) |
|  | Carbon black N660 | 60 | 60 | 60 | 60 |
|  | Oil 1 | 5.0 | 7.0 | 5.0 | 7.0 |
|  | C5 petroleum resin 1 | 5.0 | 5.0 | 5.0 | 5.0 |
|  | Processing aid 1 | 2.0 | — | 2.0 | — |
|  | Antioxidant RD | 1.0 | 1.0 | — | — |
|  | Antioxidant 6C | — | — | 1.0 | 1.0 |
|  | Stearic acid | 1.5 | 1.5 | 1.5 | 1.5 |
|  | Zinc oxide | 1.5 | 1.5 | 1.5 | 1.5 |
|  | Sulfur (containing 5% by mass of oil) | 0.4 | 0.4 | 0.4 | 0.4 |
|  | Vulcanization accelerator DM | 1.2 | 1.2 | 1.2 | 1.2 |
| Evaluation | Sheet processability index | 115 | 100 | 110 | 100 |
|  | Air retention properties index | 110 | 100 | 110 | 100 |

TABLE 4

|  |  | Example 1-2 | Comparative Example 1-1 | Comparative Example 4-1 | Comparative Example 4-2 |
|---|---|---|---|---|---|
| Formulation (parts by mass) | NR | 20 | 20 | 20 | 20 |
|  | Halogenated butyl rubber | 70 | 70 | 70 | 70 |
|  | Reclaimed butyl-based rubber (Butyl-based rubber content) | 20 (10) | 20 (10) | 20 (10) | 20 (10) |
|  | Carbon black N660 | 60 | 60 | 60 | 60 |
|  | Oil 1 | 5.0 | 7.0 | 10.0 | 12.0 |
|  | C5 petroleum resin 1 | 5.0 | 5.0 | — | — |
|  | Processing aid 1 | 2.0 | — | 2.0 | — |
|  | Antioxidant RD | 1.0 | 1.0 | 1.0 | 1.0 |
|  | Stearic acid | 1.5 | 1.5 | 1.5 | 1.5 |
|  | Zinc oxide | 1.5 | 1.5 | 1.5 | 1.5 |
|  | Sulfur (containing 5% by mass of oil) | 0.4 | 0.4 | 0.4 | 0.4 |
|  | Vulcanization accelerator DM | 1.2 | 1.2 | 1.2 | 1.2 |
| Evaluation | Sheet processability index | 115 | 100 | 105 | 100 |
|  | Air retention properties index | 110 | 100 | 100 | 95 |

TABLE 5

|  |  | Example 5-1 | Comparative Example 5-1 |
|---|---|---|---|
| Formulation (parts by mass) | NR | 10 | 10 |
|  | Halogenated butyl rubber | 80 | 80 |
|  | Reclaimed butyl-based rubber (Butyl-based rubber content) | 20 (10) | 20 (10) |
|  | Carbon black N660 | 60 | 60 |
|  | Oil 1 | 4.0 | 7.0 |
|  | C5 petroleum resin 1 | 5.0 | 5.0 |
|  | Processing aid 1 | 3.0 | — |
|  | Antioxidant RD | 1.0 | 1.0 |
|  | Stearic acid | 1.5 | 1.5 |
|  | Zinc oxide | 1.5 | 1.5 |
|  | Sulfur (containing 5% by mass of oil) | 0.4 | 0.4 |
|  | Vulcanization accelerator DM | 1.2 | 1.2 |
| Evaluation | Sheet processability index | 110 | 100 |
|  | Air retention properties index | 115 | 100 |

TABLE 6

|  |  | Example 6-1 | Comparative Example 6-1 |
|---|---|---|---|
| Formulation (parts by mass) | NR | 20 | 20 |
|  | Halogenated butyl rubber | 70 | 70 |
|  | Reclaimed butyl-based rubber (Butyl-based rubber content) | 20 (10) | 20 (10) |
|  | Carbon black N660 | 60 | 60 |
|  | Oil 2 | 4.0 | 7.0 |
|  | C5 petroleum resin 1 | 5.0 | 5.0 |
|  | Processing aid 1 | 3.0 | — |
|  | Antioxidant RD | 1.0 | 1.0 |
|  | Stearic acid | 1.5 | 1.5 |
|  | Zinc oxide | 1.5 | 1.5 |
|  | Sulfur (containing 5% by mass of oil) | 0.4 | 0.4 |
|  | Vulcanization accelerator DM | 1.2 | 1.2 |
| Evaluation | Sheet processability index | 110 | 100 |
|  | Air retention properties index | 110 | 100 |

TABLE 7

|  |  | Example 7-1 | Comparative Example 7-1 |
|---|---|---|---|
| Formulation (parts by mass) | NR | 20 | 20 |
|  | Halogenated butyl rubber | 70 | 70 |
|  | Reclaimed butyl-based rubber (Butyl-based rubber content) | 20 (10) | 20 (10) |
|  | Carbon black N660 | 60 | 60 |
|  | Oil 1 | 4.0 | 7.0 |
|  | C5 petroleum resin 2 | 5.0 | 5.0 |
|  | Processing aid 1 | 3.0 | — |
|  | Antioxidant RD | 1.0 | 1.0 |
|  | Stearic acid | 1.5 | 1.5 |
|  | Zinc oxide | 1.5 | 1.5 |
|  | Sulfur (containing 5% by mass of oil) | 0.4 | 0.4 |
|  | Vulcanization accelerator DM | 1.2 | 1.2 |
| Evaluation | Sheet processability index | 110 | 100 |
|  | Air retention properties index | 110 | 100 |

Tables 1 and 5 to 7 show that when a predetermined amount of the mixture was added to compositions containing a large amount of a butyl-based rubber, the compositions exhibited a balanced improvement of sheet processability and air retention properties. Moreover, Tables 2 to 4 demonstrate that when the mixture was added to compositions containing a reclaimed butyl-based rubber, compositions containing a quinoline antioxidant, or compositions containing an oil and a C5 petroleum resin, the compositions exhibited a significantly (synergistically) improved balance of sheet processability and air retention properties.

The invention claimed is:

1. An innerliner rubber composition, comprising:
   a rubber component;
   a mixture of a fatty acid metal salt and a fatty acid amide;
   an oil; and
   a C5 petroleum resin,
   wherein the rubber component comprises at least 70% by mass of a butyl-based rubber based on 100% by mass thereof, the mixture is in an amount in a range of 0.8 to 3.2 parts by mass per 100 parts by mass of the rubber component, and the mixture, the oil, and the C5 petroleum resin are in a combined amount in a range of 6.0 to 16.0 parts by mass per 100 parts by mass of the rubber component.

2. The innerliner rubber composition according to claim 1, wherein the butyl-based rubber of the rubber component comprises a reclaimed butyl-based rubber.

3. The innerliner rubber composition according to claim 1, further comprising:
   a quinoline antioxidant.

4. The innerliner rubber composition according to claim 2, further comprising:
   a quinoline antioxidant.

5. The innerliner rubber composition according to claim 1, wherein the mixture is such that a fatty acid of the fatty acid metal salt is at least one of C6-C28 saturated or unsaturated fatty acids, a metal of the fatty acid metal salt is at least one metal selected from the group consisting of an alkali metal and an alkaline earth metal, and the fatty acid amide is at least one saturated or unsaturated fatty acid amide selected from the group consisting of N-(1-oxooctadecyl)sarcosine, stearamide, behenamide, oleamide and erucamide.

6. The innerliner rubber composition according to claim 1, wherein the mixture is such that a fatty acid of the fatty acid metal salt is at least one of C10-C25 saturated or unsaturated fatty acids, a metal of the fatty acid metal salt is at least one metal selected from the group consisting of an alkali metal and an alkaline earth metal, and the fatty acid amide is at least one saturated or unsaturated fatty acid amide selected from the group consisting of N-(1-oxooctadecyl)sarcosine, stearamide, behenamide, oleamide and erucamide.

7. The innerliner rubber composition according to claim 1, wherein the mixture is such that a fatty acid of the fatty acid metal salt is at least one of C14-C20 saturated or unsaturated fatty acids, a metal of the fatty acid metal salt is at least one metal selected from the group consisting of an alkali metal and an alkaline earth metal, and the fatty acid amide is at least one saturated or unsaturated fatty acid amide selected from the group consisting of N-(1-oxooctadecyl)sarcosine, stearamide, behenamide, oleamide and erucamide.

8. The innerliner rubber composition according to claim 1, wherein the mixture is such that a fatty acid of the fatty acid metal salt is at least one of C6-C28 saturated or unsaturated fatty acids, a metal of the fatty acid metal salt is at least one alkaline earth metal selected from the group consisting of zinc and calcium, and the fatty acid amide is at least one saturated or unsaturated fatty acid amide selected from the group consisting of N-(1-oxooctadecyl)sarcosine, stearamide, behenamide, oleamide and erucamide.

9. The innerliner rubber composition according to claim 1, further comprising:
   a carbon black having a nitrogen adsorption specific surface area in a range of 10 to 70 $m^2/g$ or more.

10. The innerliner rubber composition according to claim 1, further comprising:
    a carbon black having a nitrogen adsorption specific surface area in a range of 20 to 40 $m^2/g$ or more.

11. The innerliner rubber composition according to claim 1, wherein the amount of the mixture is in a range of 1.0 to 3.2 parts by mass per 100 parts by mass of the rubber component.

12. The innerliner rubber composition according to claim 1, wherein the amount of the mixture is in a range of 1.2 to 3.2 parts by mass per 100 parts by mass of the rubber component.

13. The innerliner rubber composition according to claim 1, wherein the amount of the mixture is in a range of 0.8 to 3.0 parts by mass per 100 parts by mass of the rubber component.

14. The innerliner rubber composition according to claim 1, wherein the amount of the mixture is in a range of 1.0 to 3.0 parts by mass per 100 parts by mass of the rubber component.

15. The innerliner rubber composition according to claim 1, wherein the amount of the mixture is in a range of 1.2 to 3.0 parts by mass per 100 parts by mass of the rubber component.

16. The innerliner rubber composition according to claim 1, further comprising:
    a carbon black having a nitrogen adsorption specific surface area in a range of 10 to 70 $m^2/g$ or more,
    wherein the mixture is such that a fatty acid of the fatty acid metal salt is at least one of C6-C28 saturated or unsaturated fatty acids, a metal of the fatty acid metal salt is at least one metal selected from the group consisting of an alkali metal and an alkaline earth metal, and the fatty acid amide is at least one saturated or unsaturated fatty acid amide selected from the group consisting of N-(1-oxooctadecyl)sarcosine, stearamide, behenamide, oleamide and erucamide.

17. The innerliner rubber composition according to claim 1, further comprising:
a carbon black having a nitrogen adsorption specific surface area in a range of 10 to 70 m²/g or more,
wherein the combined amount of the mixture, the oil, and the C5 petroleum resin is such that an amount of the oil is in a range of 3.0 to 9.0 parts by mass per 100 parts by mass of the rubber component and that an amount of the C5 petroleum resin is in a range of 2.0 to 9.0 parts by mass per 100 parts by mass of the rubber component, the mixture is such that a fatty acid of the fatty acid metal salt is at least one of C6-C28 saturated or unsaturated fatty acids, a metal of the fatty acid metal salt is at least one metal selected from the group consisting of an alkali metal and an alkaline earth metal, and the fatty acid amide is at least one saturated or unsaturated fatty acid amide selected from the group consisting of N-(1-oxooctadecyl)sarcosine, stearamide, behenamide, oleamide and erucamide.

18. A pneumatic tire, comprising:
an innerliner comprising the innerliner rubber composition of claim 1.

19. A pneumatic tire, comprising:
an innerliner comprising the innerliner rubber composition of claim 2.

20. A pneumatic tire, comprising:
an innerliner comprising the innerliner rubber composition of claim 3.

* * * * *